US008893153B2

(12) United States Patent
Bohrer et al.

(10) Patent No.: US 8,893,153 B2
(45) Date of Patent: *Nov. 18, 2014

(54) INTER-THREAD DATA COMMUNICATIONS IN A COMPUTER PROCESSOR

(71) Applicant: International Business Machines Corporation, Armonk, NY (US)

(72) Inventors: Patrick J. Bohrer, Cedar Park, TX (US); Ahmed Gheith, Austin, TX (US); James L. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,335

(22) Filed: Oct. 11, 2013

(65) Prior Publication Data

US 2014/0040901 A1 Feb. 6, 2014

Related U.S. Application Data

(63) Continuation of application No. 12/958,980, filed on Dec. 2, 2010, now Pat. No. 8,572,628.

(51) Int. Cl.
*G06F 9/54* (2006.01)
*G06F 9/46* (2006.01)

(52) U.S. Cl.
CPC . *G06F 9/46* (2013.01); *G06F 9/546* (2013.01)
USPC .......................... 719/313; 712/225

(58) Field of Classification Search
CPC ...................................................... G06F 9/546
USPC .................... 712/214, 215, 225; 719/313
See application file for complete search history.

(56) References Cited

U.S. PATENT DOCUMENTS

| 5,815,727 | A | 9/1998 | Motomura |
| 7,861,249 | B2 | 12/2010 | Jiang et al. |
| 8,572,628 | B2 | 10/2013 | Bohrer et al. |
| 2004/0268093 | A1 | 12/2004 | Samra et al. |
| 2009/0216993 | A1 | 8/2009 | Venkumahanti et al. |
| 2009/0257450 | A1 | 10/2009 | Sirigiri et al. |
| 2009/0300651 | A1 | 12/2009 | Jiang et al. |
| 2010/0005277 | A1 | 1/2010 | Gibert et al. |
| 2012/0144395 | A1 | 6/2012 | Bohrer et al. |

FOREIGN PATENT DOCUMENTS

| CN | 1168730 | 12/1997 |
| EP | 1316898 | 6/2003 |
| WO | 2008054941 | 5/2008 |

OTHER PUBLICATIONS

"U.S. Appl. No. 12/958,980 Office Action", Mar. 1, 2013, 11 pages.

(Continued)

*Primary Examiner* — Brian W Wathen
(74) *Attorney, Agent, or Firm* — DeLizio Gilliam, PLLC

(57) ABSTRACT

A first set of one or more hardware threads for receiving messages sent from hardware threads are registered. After receiving indications of a message location value and a number, the message location value is increments and sent to a different hardware thread of the first set of one or more hardware threads until the message location value has been incremented the number of times or a criterion for interrupting the incrementing and sending is satisfied. An actual number of times the message location value was incremented is indicated to a hardware thread that sent the indications of the message location value and the number.

20 Claims, 9 Drawing Sheets

(56) References Cited

OTHER PUBLICATIONS

Marr, Deborah T. et al., "Hyper-Threading Technology Architecture and Microarchitecture", Publisher Intel Technology Journal; vol. 06, Issue 01 www.intel.com/technology/itj/2002/volume06issue01/vol6iss1_hyper_threading_technology.pdf Feb. 14, 2002, 66 pages.

Reyes, Victor et al., "A Multicast Inter-Task Communication Protocol for Embedded Multiprocessor Systems", Proceedings of the 3rd IEEE/ACM/IFIP international conference on Hardware/software codesign and system synthesis 2005, pp. 267-272.

US 8,893,153 B2

INTER-THREAD DATA COMMUNICATIONS IN A COMPUTER PROCESSOR

RELATED APPLICATIONS

This continuation application claims the benefit of U.S. patent application Ser. No. 12/958,980 filed Dec. 2, 2010.

BACKGROUND

1. Field of the Invention

The field of the invention is data processing, or, more specifically, methods, apparatus, and products for inter-thread data communications in a computer processor.

2. Description of Related Art

Computers are becoming more and more sophisticated and powerful. Computer software increasingly requires greater processing power from computer hardware and complexity of computer hardware increases accordingly. Current computer processors, for example, include a great number of hardware threads within which a great number of software threads may be executed. Presently, communication between such hardware threads is burdensome, time consuming, resource consuming, and inefficient.

SUMMARY OF THE INVENTION

Embodiments include a method comprising registering a first set of one or more hardware threads for receiving messages sent from hardware threads, The method also includes incrementing a message location value and sending the incremented message location value to a different hardware thread of the first set of one or more hardware threads until the message location value has been incremented a number of times or a criterion for interrupting the incrementing and sending is satisfied. The incrementing and sending occurs after receiving indications of the message location value and the number. The method also includes indicating, to a hardware thread that sent the indications of the message location value and the number, an actual number of times the message location value was incremented.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
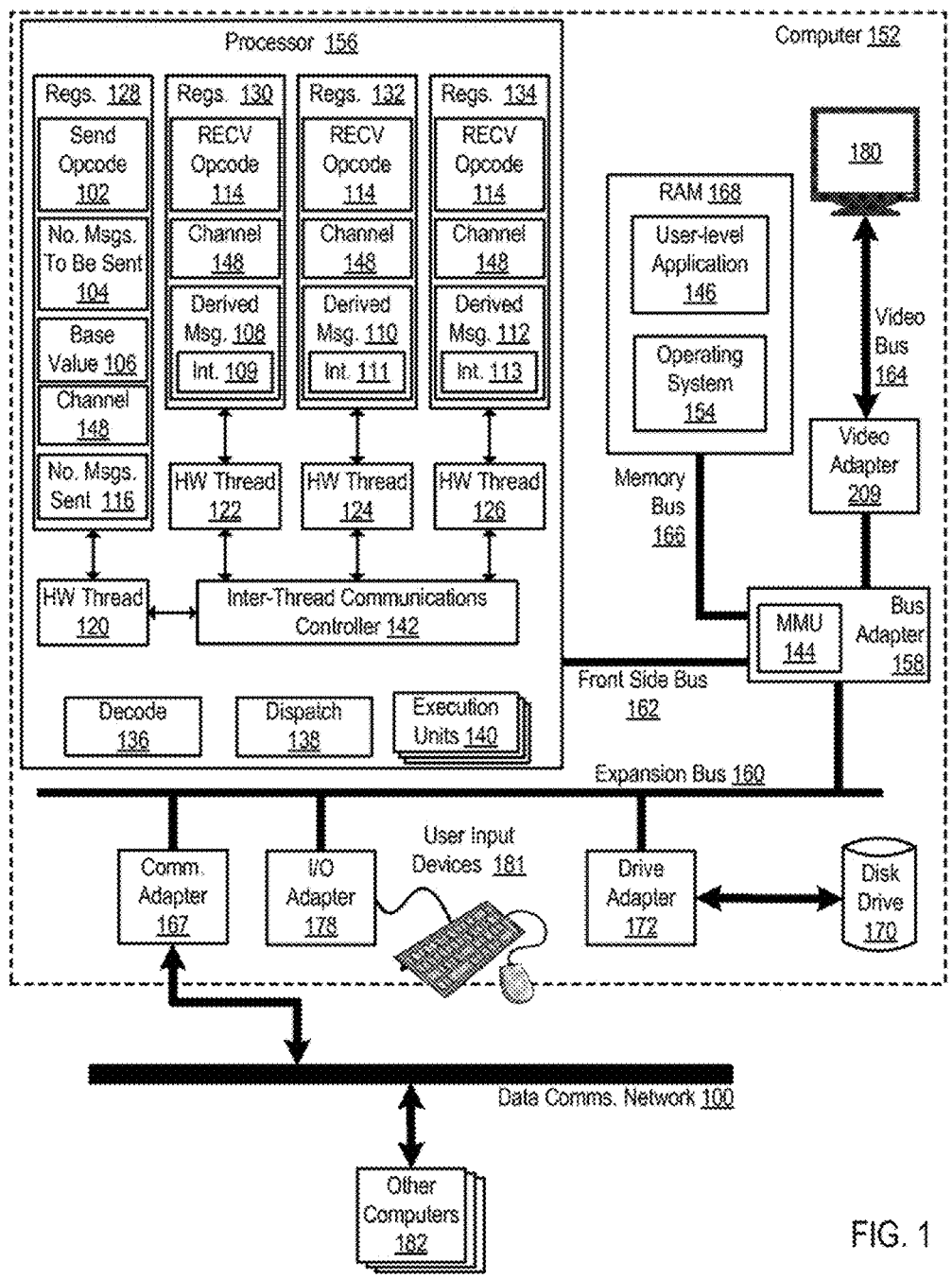
FIG. 1 sets forth a network diagram of a system for inter-thread data communications in a computer processor according to embodiments of the present invention.

Exemplary methods, apparatus, and products for inter-thread data communications in a computer processor in accordance with the present invention are described with reference to the accompanying drawings, beginning with FIG. 1. FIG. 1 sets forth a network diagram of a system for inter-thread data communications in a computer processor according to embodiments of the present invention. The system of FIG. 1 includes automated computing machinery comprising an example computer (152). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example processor (156) of the computer (152) in the system of FIG. 1 includes multiple hardware threads (120, 122, 124, and 126) of execution. Hardware threads provide physical means by which computer program instructions of software threads are executed. A software thread is the smallest unit of processing that can be scheduled by an operating system for execution on a processor. A software thread is typically contained inside a process. Multiple software threads can exist within the same process and share resources such as memory, while different processes do not share these resources. In particular, the software threads of a process share the process's instructions and context—values variables have at any given moment in execution. A 'hardware' thread, by contrast, is implemented in hardware of a computer processor and executes instructions of software threads. That is, support for a hardware thread is built into the processor itself in the form of a separate architectural register set for each hardware thread, so that each hardware thread can execute simultaneously with no need for context switches among the hardware threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread. In the example of FIG. 1, each of the hardware threads (120, 122, 124, and 126) has a corresponding set of registers (128, 130, 132, and 134).

In the example of FIG. 1, computer program instructions may be executed within a hardware thread (120, 122, 124, and 126) through use of an instruction decoder (136), an instruction dispatcher (138), and execution units (140). An instruction decoder (136) is a network of static and dynamic logic within the processor (156) that retrieves instructions from registers in the register sets (128, 130, 132, and 134) and decodes the instructions into microinstructions for execution on execution units (140) within the processor. An instruction to be decoded for execution, for example may include an opcode (operation code). An opcode is the portion of a machine language instruction that specifies the operation to be performed. Apart from the opcode itself, an instruction may also have one or more parameters, also called operands, on which the operation should act, although some operations may have implicit operands or none at all. Depending on the architecture of the processor upon which the opcode is decoded and executed, the operands may be register values, values in a call stack, other memory values, I/O ports, and the like. Once decoded, execution units (140) execute the microinstructions. Examples of execution units include LOAD execution units, STORE execution units, floating point execution units, execution units for integer arithmetic and logical operations, and so on. The computer processor (156) in the example of FIG. 1 also includes an instruction dispatcher (138) that arbitrates, in the presence of resource contention, priorities for dispatch of instructions from the hardware threads (120, 122, 124, and 126) of execution. The instruction dispatcher (138) is a network of static and dynamic logic within the processor (156) that dispatches microinstructions to the execution units (140) in the processor (156).

Each hardware thread (120, 122, 124, and 126) in the example of FIG. 1 is operatively coupled for data communications through an inter-thread communications controller (142). In the system of FIG. 1, the example inter-thread communications controller (142) is a network of static and dynamic logic within the processor (156) configured for inter-thread data communications in accordance with embodiments of the present invention. The inter-thread data communications controller (142) in the example of FIG. 1 administers inter-thread data communications in the computer processor (156) in accordance with embodiments of the present invention by, among other actions, registering, responsive to one or more RECEIVE opcodes (114), one or more receiving threads (122, 124, and 126). A receiving thread, as the term is used in this specification, refers to a hardware thread that executes a RECEIVE opcode (114). An example RECEIVE opcode (114) may be implemented as follows: recv. rt, where the operand 'rt' specifies a register in which the inter-thread data communications controller (142) is to store a message sent from a sending thread to the receiving thread executing the example RECEIVE opcode.

In some embodiments, such as those set forth in the example of FIG. 1, each RECEIVE opcode (114) also specifies a channel (148). A channel as the term is used in this specification refers to an effective, or virtualized data communications coupling, for purposes of inter-thread data communications, between sending threads and receiving threads. Such a coupling need not be a direct physical coupling, but is instead, an abstraction of a physical coupling; a virtualized data communications channel between a transmitter (sending thread) and receiving (receiving thread). In the example of FIG. 1, and as described below in greater detail, the inter-thread communications controller (142) is configured to effectively virtualize physical communication connections between a sending and receiving thread through the use of such channels. A channel may be specified as a value—an integer, memory address, or other channel identifying value. In some embodiments a channel may be specified virtual memory addresses that map to a same hardware memory address for all threads using the same channel. In embodiments in which sending and receiving threads specify channels, the inter-thread communications controller (142) is configured to allow communications between a sending and receiving thread that specify the same channel—as if the two threads were directly physically coupled. Conversely, when a sending thread and receiving thread specify different channels, the inter-thread communications controller (142) is configured to prohibit communications between the two threads. Described here is but one example use among many possible uses of channels in inter-thread data communications according to embodiments of the present invention. Further examples are described below.

A hardware thread that executes a SEND opcode (102) is referred to in this specification as a 'sending' thread. In inter-thread data communications according to embodiments of the present invention, the example inter-thread communications controller (142) also receives, from a SEND opcode (102) of a sending thread (120), specifications of a number (104) of derived messages (108, 110, and 112) to be sent to receiving threads and a base value (106). In embodiments in which the inter-thread communications controller (142) is configured to administer communications in accordance with channels, such as the embodiments set forth in the example of FIG. 1, the SEND opcode (102) may further specify a channel (148).

Data communications messages transmitted among hardware threads in accordance with embodiments of the present invention are descried in this specification as 'derived' messages in that the content of such messages is derived from the base value provided by the sending thread. Such derivation of messages is described in greater detail below. The number (104) of derived message to be sent may be a value stored in a register (128) of the sending thread (120) or other memory location and the specification of the SEND opcode (102) of the number (104) of derived messages to be sent may be implemented as an operand or parameter of the SEND opcode identifying the register (128) or memory location storing the value. For a number of reasons, some of which are described below, the inter-thread communications controller (142) may send only a portion of the specified number of derived messages to be sent. A sending thread, for example, may request 1000 messages to be sent, but the inter-thread communications controller (142) may only send 100 of those 1000 requested messages.

The base value (106) may be an integer value, such as zero or some memory address, stored in a register or other memory location, where the specification of the base value (106) in the SEND opcode may be implemented as an operand or parameter of the opcode identifying the register or memory location storing the base value. Consider, as an example of a SEND opcode configured for inter-thread communications carried out according to embodiments of the present invention, the following opcode: send. base, limit, chan. In this example opcode the operand 'base' specifies a register storing, as the base value (106), an integer value, the operand 'limit' specifies a register storing, as the number (104) of derived messages to be sent, another integer value, and the operand 'chan' specifies a register storing, as a channel, a channel identifying value, such as a memory address.

As explained below in detail the inter-thread communications controller increments the base value once for each derived message sent to a registered receiving thread. As such, in some embodiments, the 'limit' specifies the number of messages to be sent as a maximum increment of the base value rather than an absolute number of messages to be sent. Consider, for example, a base value of 5 and a limit of 10. In this example, when the limit specifies a number of messages to be sent as a maximum increment of the base value, the number of messages to be sent is 5, not 10.

In inter-thread data communications according to embodiments of the present invention the example inter-thread communications controller (142) of FIG. 1 also generates the derived messages. The inter-thread communications controller (142) generates the derived messages by incrementing the base value (106) once for each registered receiving thread so that each derived message (108, 110, and 112) comprises a single integer (109, 111, and 113) as a separate increment of the base value (106). Consider, for example a SEND opcode specifying four derived messages to be sent and a base value of zero. In such an example, the inter-thread communications controller (152) may increment the base value to an integer of one for a first derived message, increment the value again to an integer of two for a second derived message, increment the value again to an integer of three for a third derived message, and increment the value again to an integer of four for a fourth derived message. Each derived message is a separate and distinct integer from other derived messages.

From the perspective of the inter-thread communications controller each generated derived message comprises an integer value. That is, the message is the integer itself. From the perspective of the receiving hardware thread, however, the integer received responsive to a SEND opcode may be used as a pointer to a memory location storing data to be processed, may be a value of a variable, may be an array index, and so on as will occur to readers of skill in the art. The registered receiving threads, for example, may use the derived message—the integer value received from the inter-thread communications controller (142)—to retrieve other data. In this way, a sending thread may transfer a relatively large amount of data to a receiving thread by sending only an integer value, a relatively small amount of data, to the receiving thread.

In inter-thread data communications according to embodiments of the present invention the example inter-thread communications controller (142) of FIG. 1 also sends, to each registered receiving thread, a derived message. That is, once the inter-thread communications controller (142) generates one or more derived messages, the inter-thread communications controller (142) sends the derived messages to registered threads. Sending the derived messages may be carried out by storing the messages in a register of each thread—a register specified as an operand of the RECEIVE opcode—and setting a flag associated with the receiving thread, designated for such purpose. An example of flag may be, for example, one or more bits in the receiving thread's condition code register.

In embodiments in which the sending thread (120) and receiving threads (122, 124, and 126) specify a channel (148), the inter-thread data communications may be configured to send the derived messages (108, 110, and 112) only to receiving threads whose RECEIVE opcodes specify the channel specified by the SEND opcode. In embodiments in which channels are specified by virtual memory addresses that map to a same hardware memory address for all threads using the same channel the inter-thread data communications controller (142) may be configured to send the derived messages (108, 110, and 112) only to receiving threads whose RECEIVE opcodes specify the virtual memory address specified by the SEND opcode.

In some embodiments, such as those set forth in the example of FIG. 1, the inter-thread communications controller (142) may be operatively coupled to one or more memory management units (144) serving the hardware threads (120, 122, 124, and 126). A memory management unit is a computer hardware component responsible for handling accesses to memory requested by a CPU. The memory management unit's functions include translation of virtual addresses to physical addresses (i.e., virtual memory management), memory protection through access permissions, cache control, bus arbitration, and, in some computer architectures, bank switching. In embodiments in which channels are specified by virtual memory addresses that map to a same hardware memory address for all threads using the same channel the inter-thread data communications controller (142) may be further configured to check the memory management units (144) for access permissions and send the derived messages (108, 110, and 112) only from a sending thread (120) having write permissions on the hardware memory address and only to receiving threads (122, 124, and 126) having read permissions on the hardware memory address of the channel. In this way—through memory read and write access permissions in the MMU (144) user—level processes may effectively set communications restrictions among hardware threads (120, 122, 124, and 126).

In inter-thread communications according to embodiments of the present invention the example inter-thread communications controller (142) of FIG. 1 also returns, to the sending thread (120), an actual number (116) of derived messages received by receiving threads. As explained above, in some instances the inter-thread communications controller (142) does not send the requested number of derived messages to receiving threads. In the example of FIG. 1, the inter-thread communications controller (142), then, is configured to report the number of derived messages actually sent. In this way, the sending thread may determine whether to reissue the SEND opcode. In the example SEND opcode above, an operand specifies a register 'rt' in which to store the actual number of message sent by the inter-thread communications controller (142). In this example, the inter-thread communications controller (142) may return the actual number of derived messages sent by maintaining a counter of the number of derived messages sent and storing the value of the counter upon the last derived message sent in the 'rt' register and setting a flag indicating message send completion. The flag may, for example, be one or more bits of the sending thread's (120) condition code register set.

Stored in RAM (168) of the computer (152) is an example user-level application (146), a module of computer program instructions for user-level data processing tasks. Examples of user-level applications (146) include word processing applications, spreadsheet applications, database management applications, multimedia library applications, multi-media editing applications, and so on as will occur to readers of skill in the art. A process for the user-level application (146) is instantiated and maintained in the operating system (154) with one or more software threads of execution. The operating system (154) administers execution of the user-level application (146), by scheduling the software threads for execution on the computer processor (156), within the hardware threads (120, 122, 124, and 126). Operating systems useful inter-thread data communications in a computer processor according to embodiments of the present invention include UNIX™, Linux™, Microsoft XP™, AIX™, IBM's i5/OS™, and others as will occur to those of skill in the art. The operating system (154) and user-level application (146) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for inter-thread data communications in a computer processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for inter-thread data communications in a computer processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
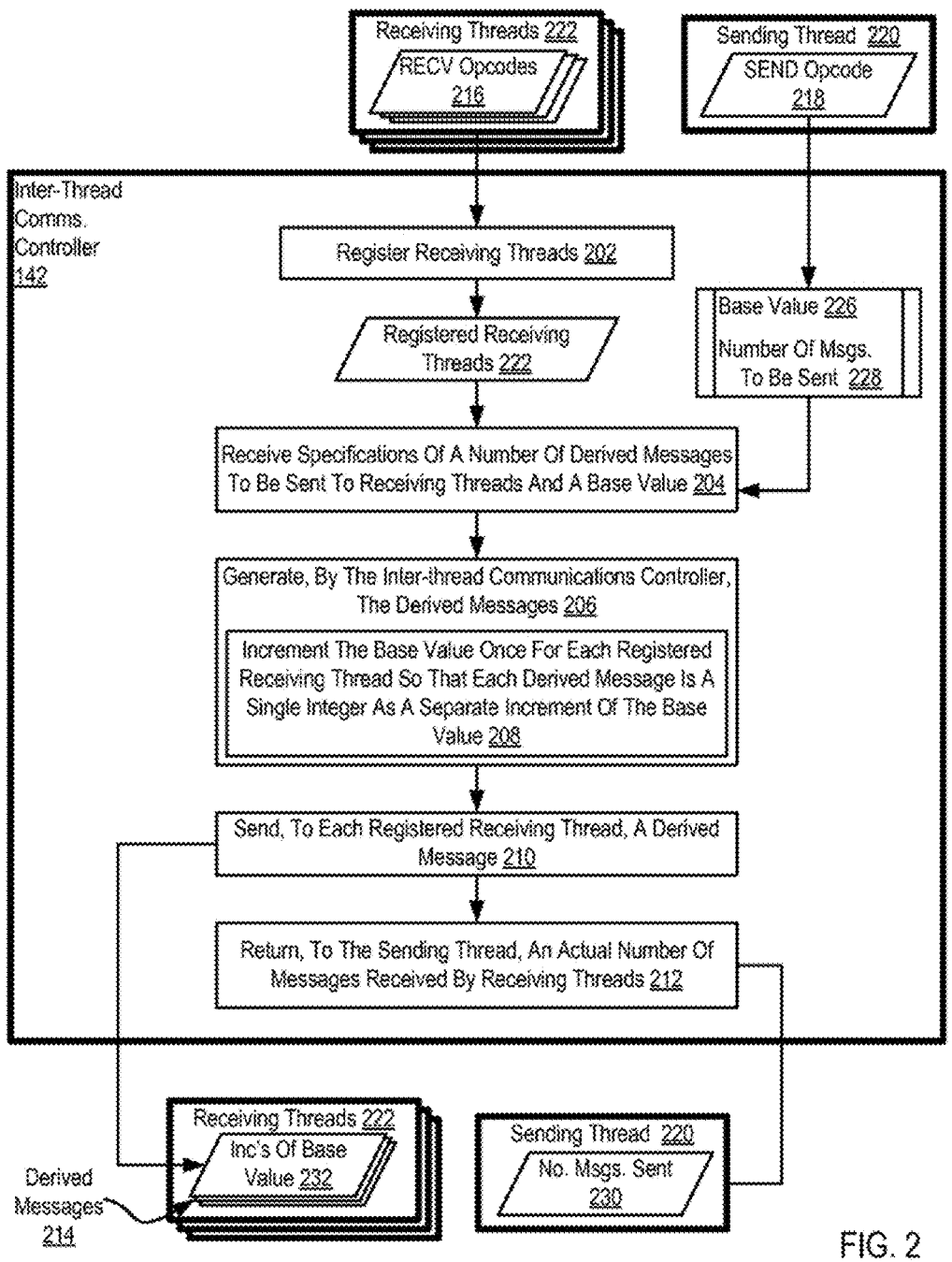
FIG. 2 sets forth a flow chart illustrating an exemplary method for inter-thread data communications in a computer processor according to embodiments of the present invention.

For further explanation, FIG. 2 sets forth a flow chart illustrating an exemplary method for inter-thread data communications in a computer processor according to embodiments of the present invention. A computer processor for which the method of FIG. 2 is carried out includes multiple hardware threads of execution, with each hardware thread operatively coupled for data communications through an inter-thread communications controller (142).

The method of FIG. 2 includes registering (202), by the inter-thread communications controller (142) responsive to one or more RECEIVE opcodes (216), one or more receiving threads (222) executing the RECEIVE opcodes (216). Registering (202) receiving threads (222) executing the RECEIVE opcodes (216) may be carried out in various ways, including, for example by storing a thread identifier in a data structure, setting a flag associated with a hardware thread that indicates the thread is registered as a receiving thread, and in other ways as will occur to readers of skill in the art. Consider, for example, a processor with 64 hardware threads. In such an example, a 64 bit segment of memory may be designated to operate as a set flags for registering receiving threads, where each bit in the 64 bit.

The method of FIG. 2 also includes receiving (204), from a SEND opcode (218) of a sending thread (220) by the inter-thread communications controller (142), specifications of a number (228) of derived messages to be sent to receiving threads (222) and a base value (226). Receiving (204) specifications of a number (228) of derived messages to be sent to receiving threads (222) and a base value (226) may be carried out by receiving an operand or parameter of the SEND opcode specifying a register or other memory location storing, as the number (228) of derived messages to be sent, an integer value and another operand or parameter of the SEND opcode specifying a register or other memory location storing, as the base value (226), another integer value.

The method of FIG. 2 also includes generating (206), by the inter-thread communications controller (142), the derived messages (214). In the method of FIG. 2, generating (206) the derived messages (214) includes incrementing (208) the base value (226) once for each registered receiving thread (222) so that each derived message (214) comprises a single integer as a separate increment (232) of the base value (226). With a base value beginning at zero, for example, the inter-thread communications controller (142) may generate four derived messages by incrementing from zero to one (a first derived message), then incrementing from one to two (a second derived message), incrementing from two to three (a third derived message), and incrementing from three to four (a fourth derived message).

The method of FIG. 2 also includes sending (210), by the inter-thread communications controller (142) to each registered receiving thread (222), a derived message (214). Sending (210) a derived message to a registered receiving thread (222) may be carried out by storing a separate increment of the base value in a register or other memory location specified by an operand of the RECEIVE opcode executed by the registered receiving thread. The inter-thread communications controller may also set a flag in the registered receiving thread that indicates storage of the derived message.

The method of FIG. 2 also includes returning (212), from the inter-thread communications controller (142) to the sending thread (220), an actual number (230) of derived messages received by receiving threads (222). Returning (212) an actual number (230) of derived messages received by receiving threads (222) may be carried out in various ways including, for example, by maintaining a counter of derived messages sent and storing the value of the counter upon the last derived message sent in a register or other memory location specified by the SEND opcode; by calculating the difference of the current base value (the final incremented value sent as a derived message) and the originally provided base value and storing the difference in a register or other memory location specified as an operand or parameter of the SEND opcode; and in other ways as will occur to readers of skill in the art. The inter-thread communications controller (142) may also set a flag in the sending thread indicating the return of the actual number of messages sent.

Figure 3:
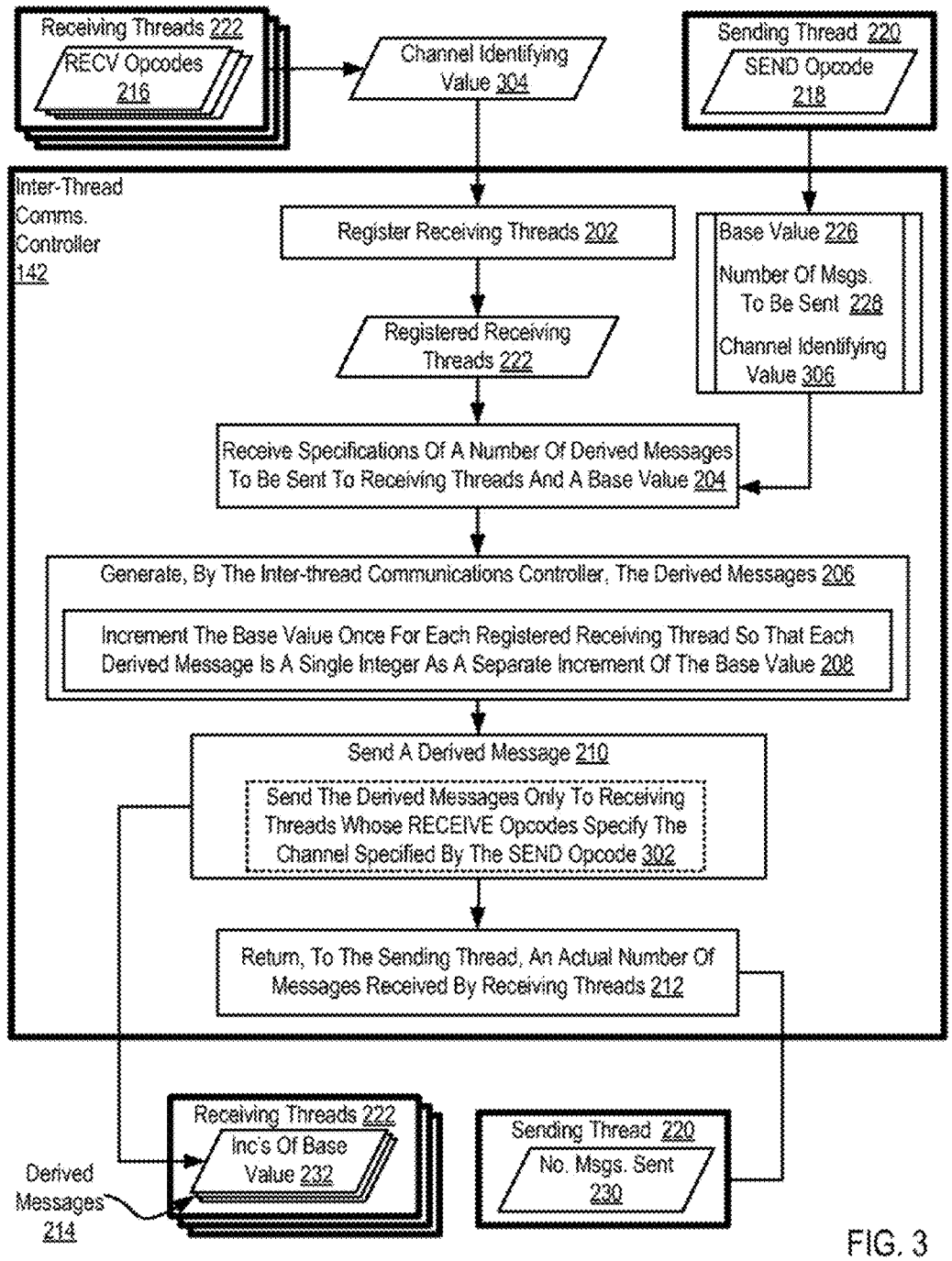
FIG. 3 sets forth a flow chart illustrating an exemplary method for inter-thread data communications in a computer processor according to embodiments of the present invention.

For further explanation, FIG. 3 sets forth a flow chart illustrating an exemplary method for inter-thread data communications in a computer processor according to embodiments of the present invention. The method of FIG. 3 is similar to the method of FIG. 2 in that the method of FIG. 3 is carried out for a computer processor that includes multiple hardware threads of execution, each of which is operatively coupled for data communications through an inter-thread communications controller. FIG. 3 is also similar to the method of FIG. 2 in that the method of FIG. 3 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 3 differs from the method of FIG. 2, however, in that in the method of FIG. 3 the SEND opcode (218) and each RECEIVE opcode specifies a channel as a channel identifying value (306, 304). A channel identifying value may be any value, an integer, a floating point number, a character string, a virtual or physical hardware memory address, and so on as will occur to readers of skill in the art. In the method of FIG. 3, sending (210) the derived message (214) to each registered receiving thread (222) is carried out by sending (302) the derived messages only to receiving threads whose RECEIVE opcodes specify the channel specified by the SEND opcode. That is, the inter-thread communications controller in accordance with the method of FIG. 3 is configured to administer data communications with channels—effectively virtualizing physical connections between hardware threads. In this way, a multiple sending threads may execute separate SEND opcodes at similar times, with different channels. That is, inter-thread data communications in accordance with the method of FIG. 3 in may be carried out in a many-to-many relationship—many sending threads-to-many receiving threads—rather than a one-to-many relationship—one sending thread-to-many receiving threads.

Figure 4:
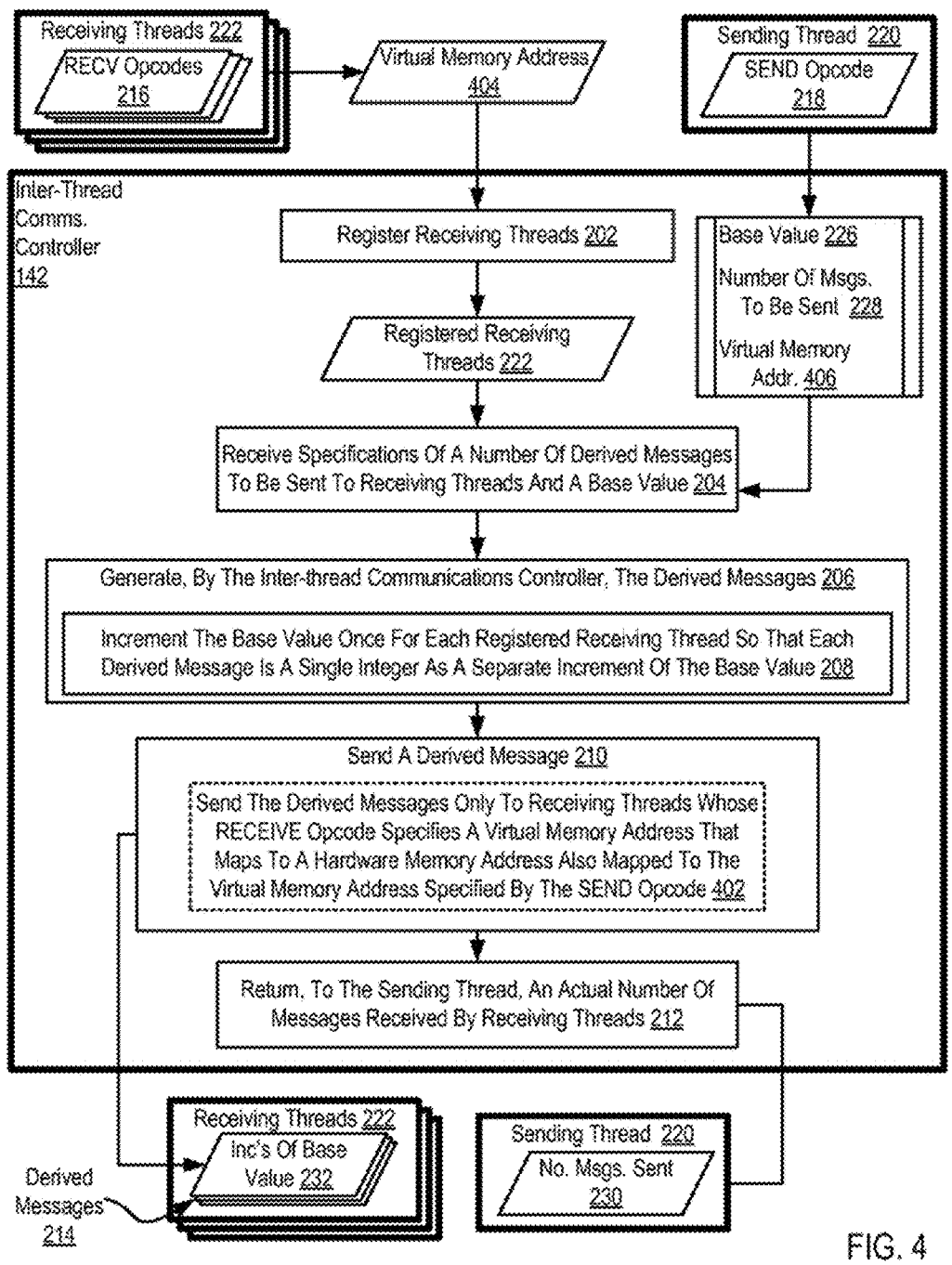
FIG. 4 sets forth a flow chart illustrating an exemplary method for inter-thread data communications in a computer processor according to embodiments of the present invention.

For further explanation, FIG. 4 sets forth a flow chart illustrating an exemplary method for inter-thread data communications in a computer processor according to embodiments of the present invention. The method of FIG. 4 is similar to the method of FIG. 2 in that the method of FIG. 4 is carried out for a computer processor that includes multiple hardware threads of execution, each of which is operatively coupled for data communications through an inter-thread communications controller. FIG. 4 is also similar to the method of FIG. 2 in that the method of FIG. 4 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 4 differs from the method of FIG. 2, however, in that the SEND opcode (218) and the RECEIVE opcodes (216) specify channels as virtual memory addresses (404, 406) that map to a same hardware memory address for all threads using the same channel. That is, a channel according to method of FIG. 4, is representing by a hardware memory address. A sending thread and a receiving thread may have a matching channel by specifying in the SEND and RECEIVE opcodes, the same hardware memory address. In FIG. 4, however, the hardware memory addresses are specified by abstractions—virtual memory addresses. The SEND opcode and RECEIVE opcode need not specify the same virtual memory address to have a matching channel, however. The SEND opcode's virtual memory address may map to a particular hardware address, while the RECEIVE opcode's virtual memory address (an address different than the SEND opcode's virtual memory address) also maps to the same particular hardware address. In this way, the actual value provided by the SEND and RECEIVE opcodes to identify a channel may be different, while still specifying the same channel.

In the method of FIG. 4, sending (210) the derived message (214) is carried out by sending (402) the derived messages only to receiving threads whose RECEIVE opcode specifies a virtual memory address that maps to a hardware memory address also mapped to the virtual memory address specified by the SEND opcode. That is, in accordance with the method of FIG. 4 the inter-thread communications controller sends a derived message from a sending thread specifying a channel as a virtual memory address that maps to a particular hardware memory address only to receiving threads specifying a channel as a virtual memory address that also maps to the same particular hardware memory address, even if the value of each of the virtual memory addresses is different.

Figure 5:
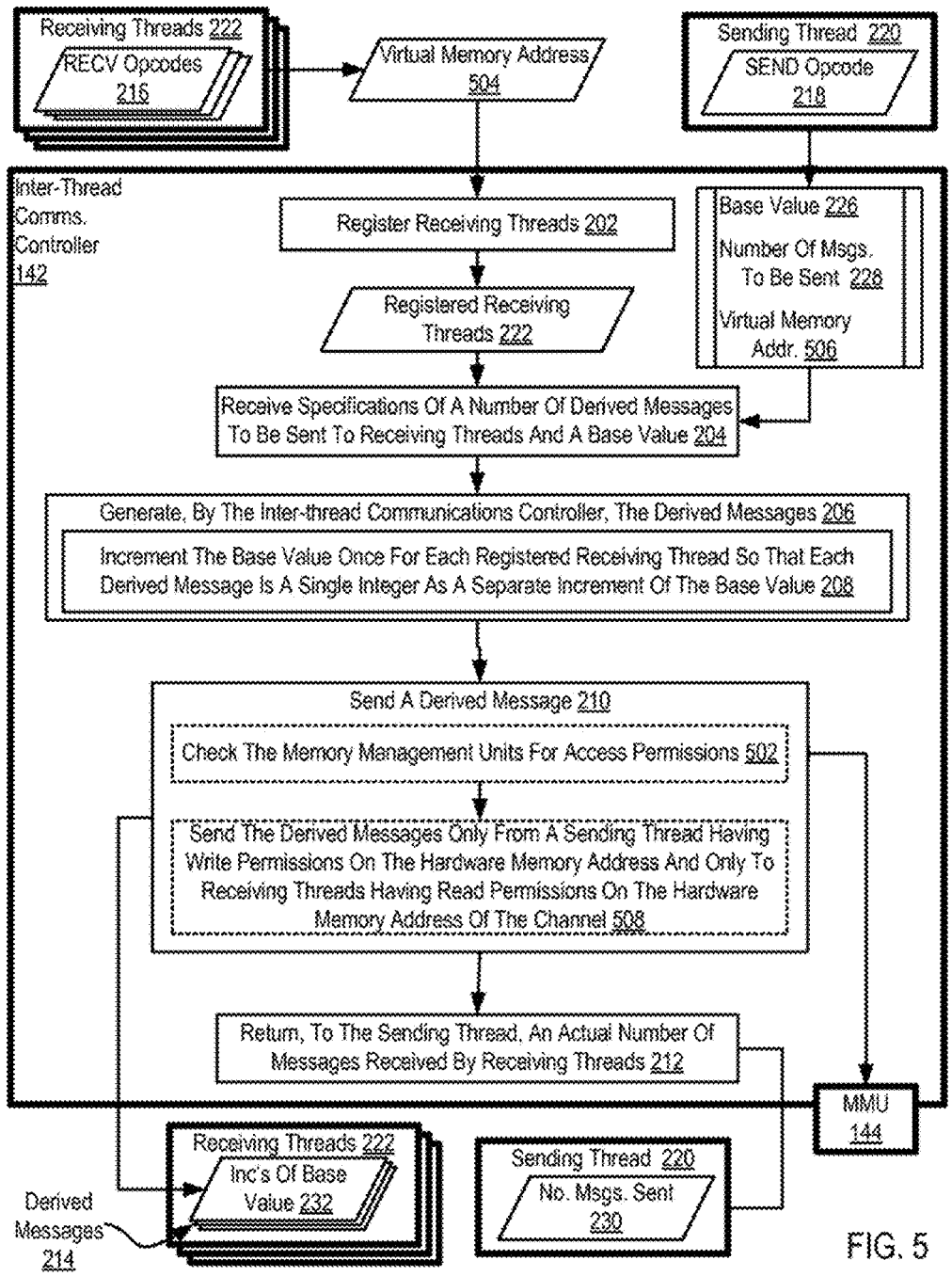
FIG. 5 sets forth a flow chart illustrating an exemplary method for inter-thread data communications in a computer processor according to embodiments of the present invention.

For further explanation, FIG. 5 sets forth a flow chart illustrating an exemplary method for inter-thread data communications in a computer processor according to embodiments of the present invention. The method of FIG. 5 is similar to the method of FIG. 2 in that the method of FIG. 5 is carried out for a computer processor that includes multiple hardware threads of execution, each of which is operatively coupled for data communications through an inter-thread communications controller. FIG. 5 is also similar to the method of FIG. 2 in that the method of FIG. 5 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 5 differs from the method of FIG. 2, however, in that the inter-thread communications controller (142) of FIG. 5 is also operatively coupled to one or more memory management units (144) serving the hardware threads and the SEND opcode (218) and the RECEIVE opcodes (216) specify channels as virtual memory addresses (506, 504) that map to a same hardware memory address for all threads using the same channel.

In the method of FIG. 5, sending (210) the derived message (214) is carried out by checking (502) the one or more memory management units for access permissions and sending (508) the derived messages only from a sending thread having write permissions on the hardware memory address and only to receiving threads having read permissions on the hardware memory address of the channel. That is, the inter-thread communications controller in the method of FIG. 5 is configured to restrict data communications among threads in dependence upon memory read and write access permissions administered by the MMUs. Such access permissions may be specified in a translation lookaside buffer, a page table, and in other ways as will occur to readers of skill in the art.

Figure 6:
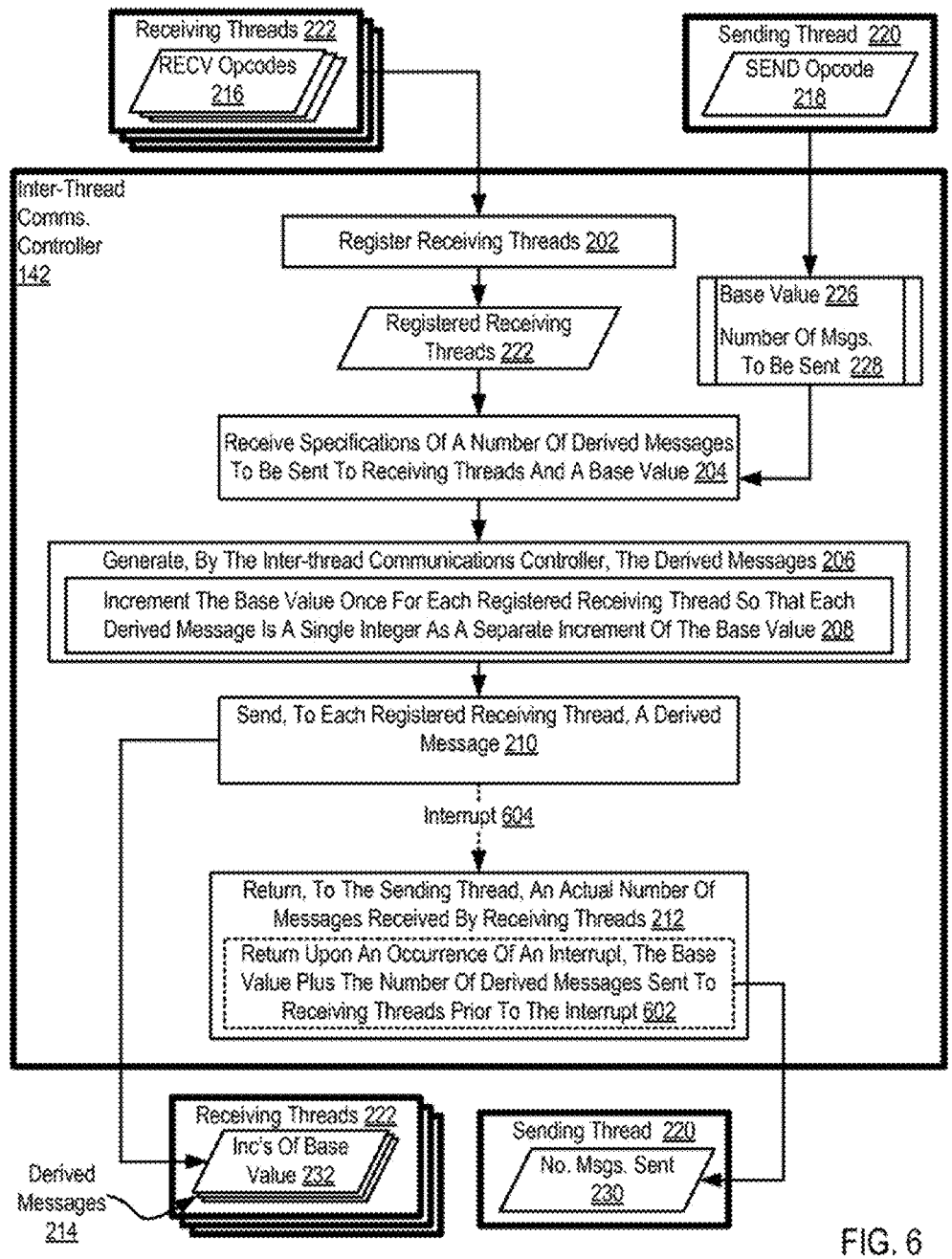
FIG. 6 sets forth a flow chart illustrating an exemplary method for inter-thread data communications in a computer processor according to embodiments of the present invention.

For further explanation, FIG. 6 sets forth a flow chart illustrating an exemplary method for inter-thread data communications in a computer processor according to embodiments of the present invention. The method of FIG. 6 is similar to the method of FIG. 2 in that the method of FIG. 6 is carried out for a computer processor that includes multiple hardware threads of execution, each of which is operatively coupled for data communications through an inter-thread communications controller. FIG. 6 is also similar to the method of FIG. 2 in that the method of FIG. 6 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 6 differs from the method of FIG. 2, however, in that in the method of FIG. 6, interrupts (604) are routed through the inter-thread communications controller (142) and returning (212) the actual number of derived messages (214) received by receiving threads (222) includes returning (602) upon an occurrence of an interrupt (604), a sum of the base value and the number of derived messages sent to receiving threads prior to the interrupt.

In addition to returning the number of message sent, the inter-thread communications controller may also return a sum of the base value and the number of derived messages sent prior to the interrupt. This sum, represents a new base value—a base value which may be provided by the sending thread to proceed with the sending. Consider, for example, that the originally provided base value is 100, the sending thread requests 1000 messages to be sent, and the inter-thread communications controller is interrupted after sending 10 messages. In this example, the inter-thread communications controller (142), in accordance with the method of FIG. 6, may return both the number of message sent, 10 messages, along with a sum of the base value and the number of message sent 110. The value 110, may be used in a second SEND opcode by the sending thread as a base value. By using the sum as the base value for a second SEND opcode, the sending thread may resume the first batch of derived messages to receiving threads at exactly the point where the sending was interrupted.

Figure 7:
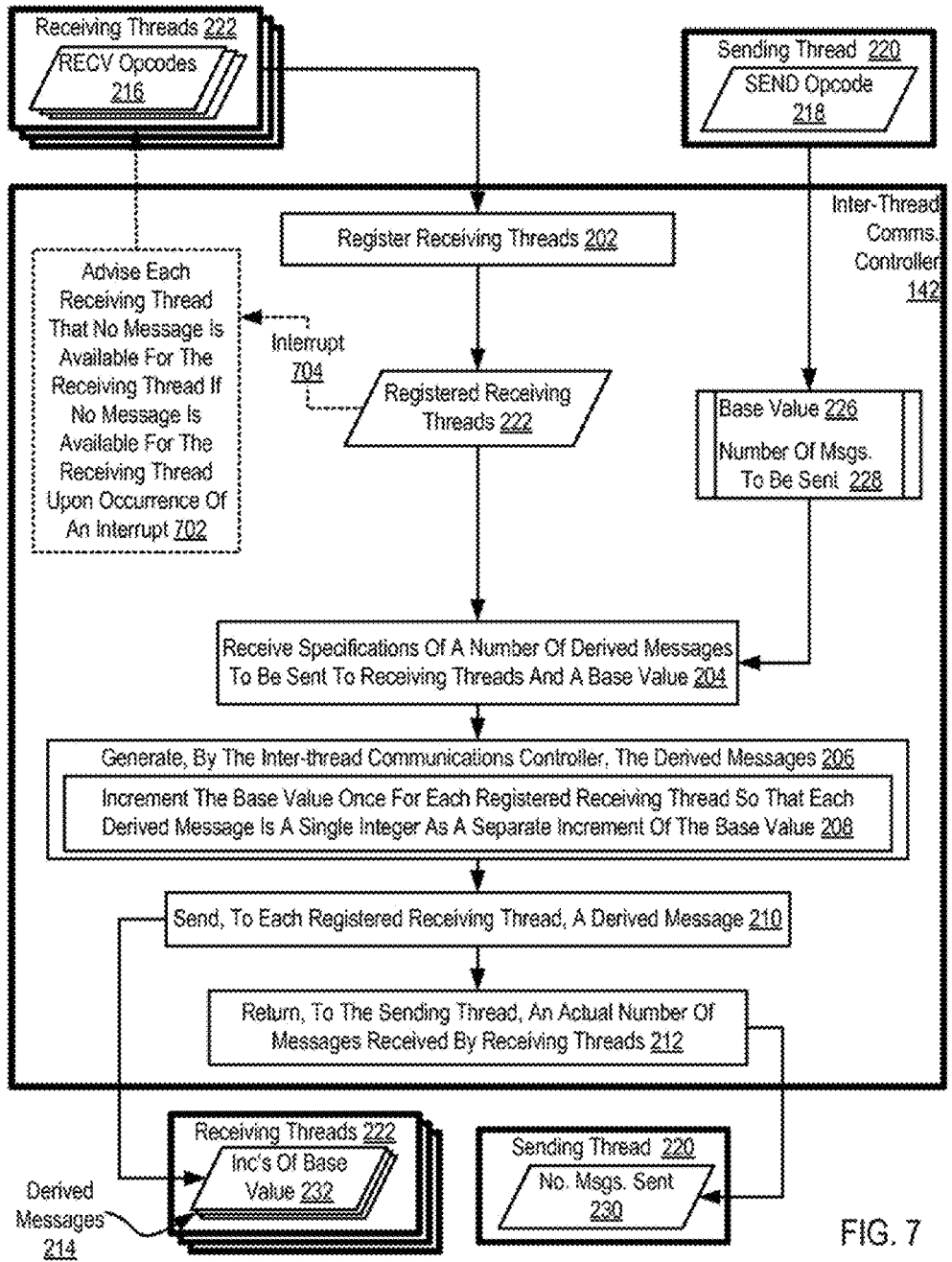
FIG. 7 sets forth a flow chart illustrating an exemplary method for inter-thread data communications in a computer processor according to embodiments of the present invention.

For further explanation, FIG. 7 sets forth a flow chart illustrating an exemplary method for inter-thread data communications in a computer processor according to embodiments of the present invention. The method of FIG. 7 is similar to the method of FIG. 2 in that the method of FIG. 7 is carried out for a computer processor that includes multiple hardware threads of execution, each of which is operatively coupled for data communications through an inter-thread communications controller. FIG. 7 is also similar to the method of FIG. 2 in that the method of FIG. 7 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 7 differs from the method of FIG. 2, however, in that in the method of FIG. 7, interrupts (704) are routed through the inter-thread communications controller (142) and FIG. 7 includes advising (702), by the inter-thread communications controller (142), each registered receiving thread (222) that no message is available for the receiving thread if no message is available for the receiving thread upon occurrence of an interrupt (704). Advising may be carried out in various ways including, storing a predetermined value in a particular register, setting a flag, and in other ways as will occur to readers of skill in the art. Registered receiving threads in accordance with the method of FIG. 7 are effectively de-registered upon an occurrence of an interrupt (704) if no messages are available to send. In this way, receiving threads can be repurposed to process other computer program instructions rather than waiting for a message that is not available during an interrupt. Alternatively, the receiving thread may reissue a RECEIVE opcode and enter a state in which the receiving thread waits for a message to be delivered.

Figure 8:
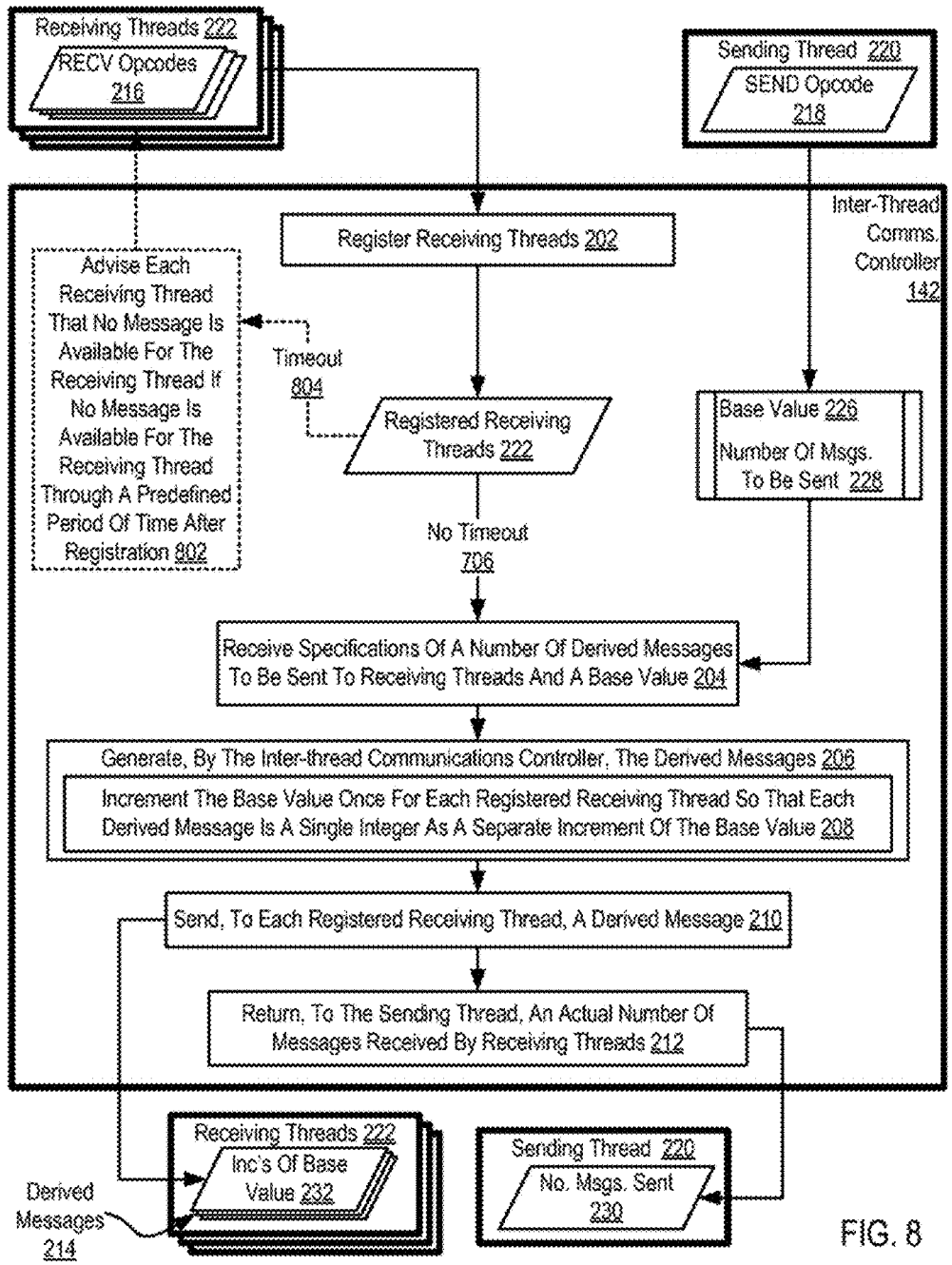
FIG. 8 sets forth a flow chart illustrating an exemplary method for inter-thread data communications in a computer processor according to embodiments of the present invention.

For further explanation, FIG. 8 sets forth a flow chart illustrating an exemplary method for inter-thread data communications in a computer processor according to embodiments of the present invention. The method of FIG. 8 is similar to the method of FIG. 2 in that the method of FIG. 8 is carried out for a computer processor that includes multiple hardware threads of execution, each of which is operatively coupled for data communications through an inter-thread communications controller. FIG. 8 is also similar to the method of FIG. 2 in that the method of FIG. 8 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 8 differs from the method of FIG. 2, however, in that the method of FIG. 8 includes advising (802), by the inter-thread communications controller (142), each registered receiving thread (222) that no message is available for the receiving thread if no message is available for the receiving thread through a predefined period of time (804) after registration. In embodiments of the present invention, a receiving thread once registered must wait for some amount of time prior to receiving a derived message. If no message is available—no sending thread issues a SEND opcode—the method of FIG. 8 provides a means by which the registered receiving thread may be repurposed, rather than waiting for extending periods of time.

Figure 9:
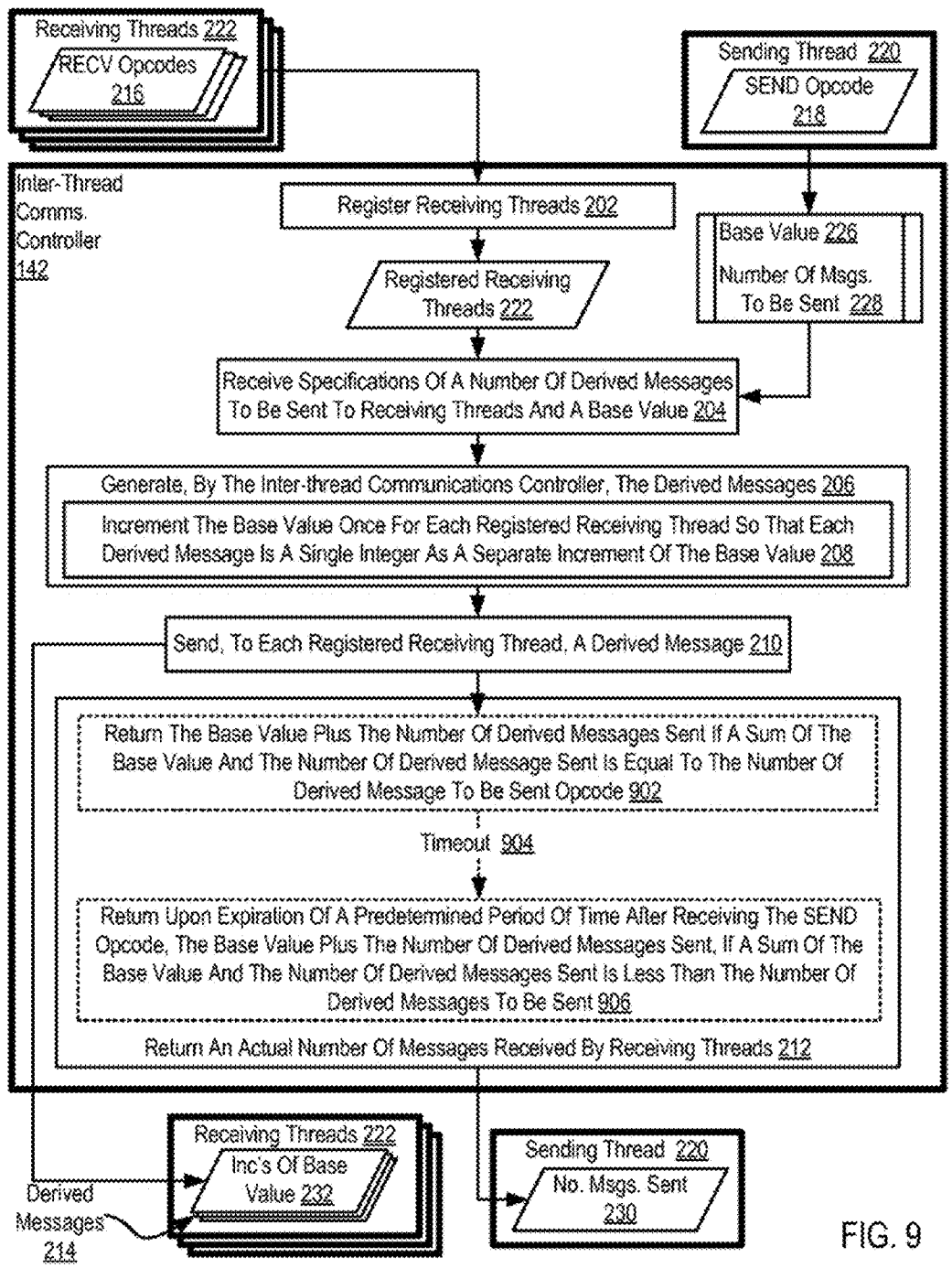
FIG. 9 sets forth a flow chart illustrating an exemplary method for inter-thread data communications in a computer processor according to embodiments of the present invention.

For further explanation, FIG. 9 sets forth a flow chart illustrating an exemplary method for inter-thread data communications in a computer processor according to embodiments of the present invention. The method of FIG. 9 is similar to the method of FIG. 2 in that the method of FIG. 9 is carried out for a computer processor that includes multiple hardware threads of execution, each of which is operatively coupled for data communications through an inter-thread communications controller. FIG. 9 is also similar to the method of FIG. 2 in that the method of FIG. 9 includes: registering (202) one or more receiving threads (222) executing the RECEIVE opcodes (216); receiving (204) specifications of a number (228) of derived messages to be sent to receiving threads (222) and a base value (226); generating (206) the derived messages (214); sending (210) a derived message (214) to each registered receiving thread (222); and returning (212) an actual number (230) of derived messages received by receiving threads (222).

The method of FIG. 9 differs from the method of FIG. 2, however, in that in the method of FIG. 9 returning (212) the actual number (230) of derived messages (214) received by receiving threads also includes returning (902) the base value plus the number of derived messages sent to receiving threads if a sum of the base value and the actual number of derived message sent is equal to the number (228) of derived message to be sent as specified by the SEND opcode (218), where the derived message to be sent is specified by the SEND opcode as a maximum increment of the base value. As mentioned above, in some embodiments, the SEND opcode specifies a number of messages to be sent as a maximum increment of the base value rather than an absolute number of messages to be sent. Consider, for example, a base value of 5 and a limit of 10. In this example, when the limit specifies a number of messages to be sent as a maximum increment of the base value, the number of messages to be sent is 5, not 10. In the method of FIG. 9, the inter-thread communications controller (142) compares the sum of the base value and the number of derived messages actually sent to the maximum increment of the base value (the number of derived messages to be sent) specified in the SEND opcode to determine whether the sending is complete—that is, whether the inter-thread communications controller has sent all requested messages.

Returning (212) the actual number (230) of derived messages (214) in the example of Figure also includes returning (906) upon expiration of a predetermined period of time (904) after receiving the specifications of the number of derived messages to be sent and the base value, the sum of the base value and the number of derived messages sent to receiving threads, if the sum of the base value and the number of derived messages sent is less than the number of derived messages to be sent as specified by the SEND opcode. The method of FIG. 9 enables a sending thread to be repurposed after a predefined period of time if sending is incomplete, and upon expiration of that predefined period of time if sending is incomplete, the inter-thread communications controller returns a value to be used as a base value in a future SEND opcode to effectively resume where the previous SEND opcode stopped. Consider, for example, a sending thread that provides a base value of 100 and a maximum increment of the base value of 1100—a request of 1000 messages to be sent. After 100 messages, the predefined period of time expires and the inter-thread communications controller in accordance with embodiments of the present invention returns the sum of the actual number messages sent and the base value—200. In this example, the sending thread may issue a subsequent SEND opcode with a base value of 200 and the same maximum increment 1100, effectively resuming where the previous SEND opcode stopped. Alternatively, the sending thread may execute other instructions. In this way, sending threads are not caught in a wait state, executing no instructions for a time longer than the predefined period of time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   registering a first set of one or more hardware threads for receiving messages sent from hardware threads;
   after receiving indications of a message location value and a number, incrementing the message location value and sending the incremented message location value to a different hardware thread of the first set of one or more hardware threads until the message location value has been incremented the number of times or a criterion for interrupting the incrementing and sending is satisfied; and
   indicating, to a hardware thread that sent the indications of the message location value and the number, an actual number of times the message location value was incremented.

2. The method of claim 1, wherein said registering a first set of one or more hardware threads for receiving messages sent from hardware threads comprises at least one of storing a thread identifier in a data structure and setting a flag associated with each hardware thread of the first set of one or more hardware threads.

3. The method of claim 1, wherein the criterion for interrupting the incrementing and sending comprises at least one of: each hardware thread of the first set of one or more hardware threads has received an incremented message location value; expiration of a predefined time period; and the message location value is equal to the number.

4. The method of claim 1, wherein said registering a first set of one or more hardware threads for receiving messages sent from hardware threads comprises indicating a first channel value associated with the first set of one or more hardware threads.

5. The method of claim 4 further comprising:
   receiving an indication of the first channel value with the indications of the message location value and the number, wherein the first channel value is associated with the hardware thread that sent the indications of the message location value and the number; and
   determining that the different hardware thread of the first set of one or more hardware threads is associated with the first channel value;
   wherein said sending the incremented message location value to a different hardware thread of the first set of one or more hardware threads is in response to said determining that the different hardware thread of the first set of one or more hardware threads is associated with the first channel value.

6. The method of claim 5, wherein the first channel value comprises one or more virtual memory addresses that resolve to the same hardware memory address.

7. The method of claim 6, further comprising:
   determining that the different hardware thread of the first set of one or more hardware threads has permission to read from the hardware memory address; and
   determining that the hardware thread that sent the indications of the message location value and the number has permission to write to the hardware memory address;
   wherein said sending the incremented message location value to a different hardware thread of the first set of one or more hardware threads is in response to said determining that the different hardware thread of the first set of one or more hardware threads has permission to read from the hardware memory address and said determining that the hardware thread that sent the indications of the message location value and the number has permission to write to the hardware memory address.

8. The method of claim 1, further comprising receiving an indication of an interrupt, wherein said indicating an actual number of times the message location value was incremented is in response to said receiving the indication of the interrupt.

9. The method of claim 1, further comprising:
   receiving at least one of an indication of an interrupt and an indication that a predetermined period of time has passed;
   in response to said receiving at least one of the indication of the interrupt and the indication that the predetermined period of time has passed, determining that a first hardware thread of the first set of one or more hardware threads has not received an incremented message location value; and
   in response to said determining that the first hardware thread has not received an incremented message location value, indicating to the first hardware thread that the first hardware thread has not received an incremented message location value.

10. The method of claim 1, wherein the message location value comprises one of a memory location, a register, a value of a variable, and an array index.

11. The method of claim 1, wherein the indication of the message location value is an indication of one of a register and a memory location, wherein the message location value is stored in one of the register and the memory location.

12. A computer program product comprising:
   a non-transitory computer readable storage medium having computer usable program code embodied therewith, the computer usable program code comprising a computer usable program code configured to,
   register a first set of one or more hardware threads for receiving messages sent from hardware threads;

after receiving indications of a message location value and a number, increment the message location value and send the incremented message location value to a different hardware thread of the first set of one or more hardware threads until the message location value has been incremented the number of times or a criterion for interrupting the incrementing and sending is satisfied; and indicate, to a hardware thread that sent the indications of the message location value and the number, an actual number of times the message location value was incremented.

13. The computer program product of claim 12, wherein the criterion for interrupting the incrementing and sending comprises at least one of: each hardware thread of the first set of one or more hardware threads has received an incremented message location value; expiration of a predefined time period; and the message location value is equal to the number.

14. The computer program product of claim 12, wherein said computer usable program code configured to register a first set of one or more hardware threads for receiving messages sent from hardware threads comprises computer usable program code configured to at least one of storing a thread identifier in a data structure and setting a flag associated with each hardware thread of the first set of one or more hardware threads.

15. The computer program product of claim 12, wherein the message location value comprises one of a memory location, a register, a value of a variable, and an array index.

16. An apparatus comprising:
one or more processors, each of which is configured to support a plurality of hardware threads; and
a communications controller coupled with the one or more processors;
wherein each hardware thread is configured to,
indicate, to the communications controller, a hardware thread identifier when the hardware thread is available to receive a message from another of the plurality of hardware threads;
indicate, to the communications controller, a message location value when the hardware thread has messages to send to other ones of the plurality of hardware threads;
wherein the communications controller is configured to,
store a hardware thread identifier indicated by a hardware thread;
for each stored hardware thread identifier or until a completion criterion has been met,
increment a message location value indicated by a hardware thread of the plurality of hardware threads, and
send the incremented message location value to a hardware thread of the plurality of hardware threads corresponding to the hardware thread identifier; and
indicate, to a hardware thread of the plurality of hardware threads that indicated a message location value, a count of incremented message location values sent to the plurality of hardware threads.

17. The apparatus of claim 16, wherein the completion criterion comprises at least one of expiration of a time period and the count of incremented message location values sent to the plurality of hardware threads is equal to a number indicated by a hardware thread of the plurality of hardware threads.

18. The apparatus of claim 16,
wherein each hardware thread is configured to further indicate, to the communications controller, at least one of a channel value associated with the respective hardware thread and a channel value associated with the message location value,
wherein the communications controller being configured to send the incremented message location value to a hardware thread of the plurality of hardware threads corresponding to the hardware thread identifier comprises the communications controller being configured to:
determine that the hardware thread of the plurality of hardware threads corresponding to the hardware thread identifier indicated the same channel value as is associated with the message location value; and
send the incremented message location value to the hardware thread of the plurality of hardware threads corresponding to the hardware thread identifier in response to a determination that the hardware thread of the plurality of hardware threads corresponding to the hardware thread identifier indicated the same channel value as is associated with the message location value.

19. The apparatus of claim 16, wherein the communications controller is further configured to:
receive at least one of an indication of an interrupt and an indication that a predetermined period of time has passed;
in response to reception of at least one of an indication of an interrupt and an indication that a predetermined period of time has passed, determine that a first hardware thread of the plurality of hardware threads has not been sent an incremented message location value; and
in response to a determination that the first hardware thread has not received an incremented message location value, indicating to the first hardware thread that the first hardware thread has not been sent an incremented message location value.

20. The apparatus of claim 16, wherein the communications controller being configured to send the incremented message location value to a hardware thread of the plurality of hardware threads corresponding to the hardware thread identifier comprises the communications controller being configured to:
determine that the hardware thread of the plurality of hardware threads that indicated the message location value has permission to write to a message location indicated by the incremented message location value;
determine that the hardware thread of the plurality of hardware threads corresponding to the hardware thread identifier has permission to read from the message location indicated by the incremented message location value; and
send the incremented message location value to the hardware thread of the plurality of hardware threads corresponding to the hardware thread identifier in response to a determination that the hardware thread of the plurality of hardware threads that indicated the message location value has permission to write to the message location indicated by the incremented message location value and a determination that the hardware thread of the plurality of hardware threads corresponding to the hardware thread identifier has permission to read from the message location indicated by the incremented message location value.

* * * * *